C. H. GRIFFIN.

Centrifugal Crushing Mill.

No. 9,546. Reissued Feb. 1, 1881.

WITNESSES

S. F. Robinson

H. W. Fuller

INVENTOR

Caleb H. Griffin

N. PETERS, PHOTO-LITHOGRAPHER, WASHINGTON, D.C.

UNITED STATES PATENT OFFICE.

CALEB H. GRIFFIN, OF BOSTON, MASSACHUSETTS.

CENTRIFUGAL CRUSHING-MILL.

SPECIFICATION forming part of Reissued Letters Patent No. 9,546, dated February 1, 1881.

Original No. 45,213, dated November 22, 1864. Application for reissue filed July 31, 1880.

*To all whom it may concern:*

Be it known that I, C. H. GRIFFIN, of Boston, in the county of Suffolk and State of Massachusetts, have invented new and useful Improvements in Centrifugal Pulverizing-Machines; and I do hereby declare that the following, taken in connection with the drawings which accompany and form part of this specification, is a description of my invention sufficient to enable those skilled in the art to practice it.

This invention relates to the construction of centrifugal crushing or pulverizing mills, the improvement consisting in combining with the rotary arms or projectors a serrated or toothed wheel rotating in the opposite direction to the arms; also, in the employment, in connection with the pipe which conducts the pulverized material into a receiver, of another pipe leading from said receiver into the pulverizer.

Figure 1:
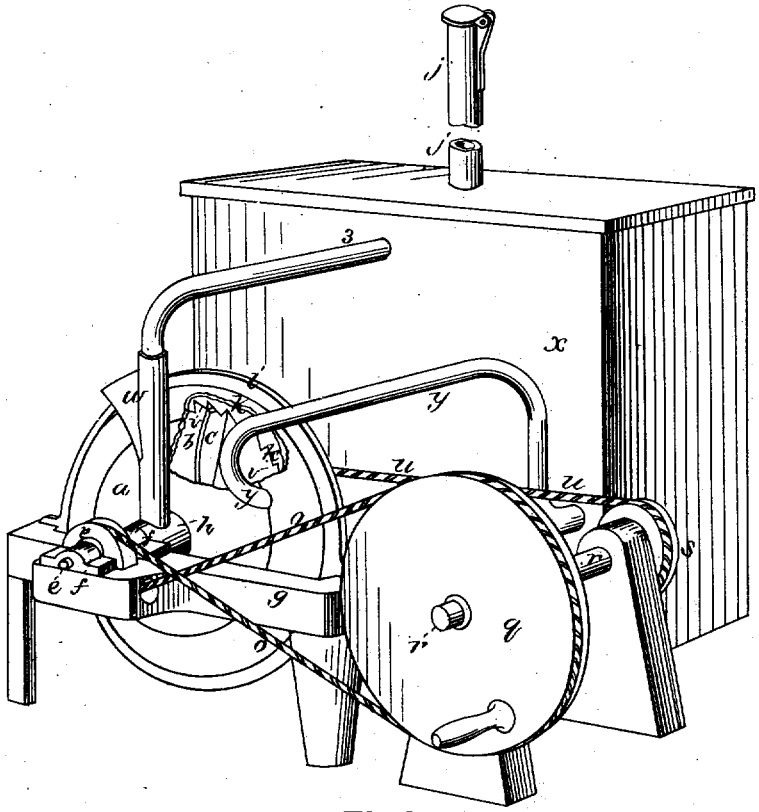
Figure 2:
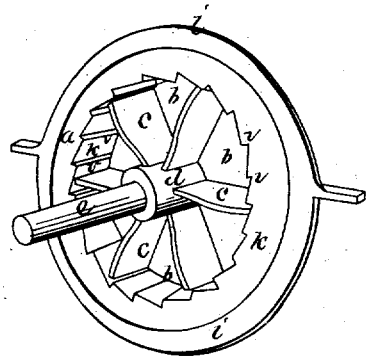
Figure 3:
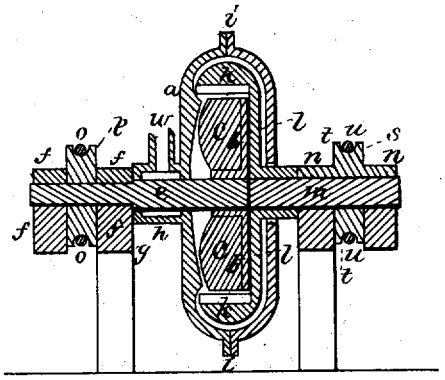

Figure 1 of the drawings represents a perspective view of a crushing apparatus embodying my invention. Fig. 2 is a view of the pulverizer, one plate or side of the case being removed. Fig. 3 is a section of the pulverizing apparatus.

*a* denotes the pulverizer-case, provided with a rotary disk, *b*, which carries the arms or projectors *c*, said arms extending in radial, or nearly radial, directions from the hub *d* to the perimeter of the disk *b*, and receiving a rotary motion from the shaft *e*, which is supported in bearings *f f* on one side of the frame *g*, and in the hub *h* on the adjacent side of the case *a*. This case is stationary, and is supported and fastened in vertical position in the frame *g*, its two halves being connected together and fastened by the flanges *i i*. The disk *b* and its arms *c* do not extend across the whole inner diameter of the case *a*, but only partially so, the concentric space beyond the arms being filled, or partially filled, by a rotary wheel, *k*, on a disk, *l*, mounted on a shaft, *m*, rotating in bearings *n n* on the opposite side of the frame *g*.

Motion is communicated to the shaft *e* by a cross-belt, *o*, running over a pulley, *p*, on the shaft *e* and a driving-pulley, *q*, on the main shaft *r*. The opposite end of this shaft *r* carries a pulley, *s*, from which motion is communicated to a pulley, *t*, on the shaft *m* by a straight belt, *u*. Thus it will be seen that the projector-arms *c* and the wheel *k* beyond them are driven in opposite directions, such opposite rotation being effected as shown or in any other convenient manner.

The inner surface of the wheel *k* is constructed with a series of serrations or teeth, one surface, *v*, of each of which is made in, or about in, a radial direction from the center of the wheel, and such distance being left between the consecutive teeth that as the arms *c* in their rotation project the material to be crushed against the wheel *k*, such material shall be thrown against these revolving surfaces, the force of the throw or projection of the material in one direction against the surfaces rotating in the opposite direction having a much more powerful effect in breaking up and powdering the material by the percussion than if the arms *c* alone rotated and threw the material against the stationary surface of the case *a*.

The feed-pipe by which the material to be operated upon is introduced into the case *a* is seen at *w*, and the pipe by which the powdered or crushed material is conducted by the blast from the case *a* into the receiver *x* is seen at *y*. As the receiver has to be closed to prevent escape of dust or fine material, the operation of the blast creates a pressure in the box or receiver *x*. To relieve this pressure and restore the equilibrium between the pressure in the box *x* and the case *a*, I conduct a pipe, *z*, from the box *x* into the feed-pipe, said pipe leading from at or near the top of the box *x*. Thus, as there is a pressure of air into the receiver from the case *a*, and a consequent exhaust of air in the case *a*, air is forced from the top of the receiver through the pipe *z*, such air increasing the draft to draw the material into the machine through the feed-pipe, and at the same time restoring the pressure between the receiver and the case *a*.

I sometimes employ a vertical ventilating-pipe, *j*, issuing from the top of the box *x*. The pressure from the blast forces the air up through the pipe, and to prevent loss of any of the powdered material which may be carried into the pipe by the pressure of the blast, I conduct the pipe to such height that the gravity of the material shall overcome the pressure from the blast and cause the powder to drop again into the box. This pipe is intended principally for use when the pipe *z* is not employed, and it is provided with a cap to be confined over and close the pipe when necessary.

The apparatus is designed for crushing quartz for the extraction of gold therefrom, but is of course adapted to the powdering or pulverizing of other materials or substances in which crushing-machines are employed.

I claim—

1. The combination of the projectors or impelling-arms and a series of rotating teeth or percussion-surfaces rotating in opposite directions, substantially as described, as and for the purpose set forth.

2. The return-pipe *z*, leading from the top of the receiver *x* into the case *a*, to relieve the pressure in the receiver *x* and restore the equilibrium between the pressure in the receiving-chamber and the case, substantially as described, as and for the purpose set forth.

3. The combination of the receiving-chamber *x*, the pulverizing-chamber *a*, the return-pipe *z* at or near the top of the receiving-chamber, the projectors or impelling-arms, and the pipe *y*, leading from the pulverizing-chamber *a* into the bottom of the receiving-chamber *x*, producing a circulation of air acting upon the material under treatment, substantially as described, as and for the purpose set forth.

CALEB H. GRIFFIN.

Witnesses:
GEO. E. BETTON,
ROBERT T. KEEFE.